(12) United States Patent
Takamori et al.

(10) Patent No.: US 9,147,905 B2
(45) Date of Patent: Sep. 29, 2015

(54) LITHIUM COMPOSITE METAL OXIDE AND POSITIVE ELECTRODE ACTIVE MATERIAL

(75) Inventors: Kenji Takamori, Tsukuba (JP); Cedric Pitteloud, Muttenz (CH)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 354 days.

(21) Appl. No.: 13/257,535

(22) PCT Filed: Mar. 18, 2010

(86) PCT No.: PCT/JP2010/055298
§ 371 (c)(1),
(2), (4) Date: Sep. 19, 2011

(87) PCT Pub. No.: WO2010/110403
PCT Pub. Date: Sep. 30, 2010

(65) Prior Publication Data
US 2012/0015231 A1    Jan. 19, 2012

(30) Foreign Application Priority Data

Mar. 23, 2009  (JP) ................................ 2009-069548
Sep. 30, 2009  (JP) ................................ 2009-226687

(51) Int. Cl.
| | |
|---|---|
| *H01M 4/131* | (2010.01) |
| *H01M 2/16* | (2006.01) |
| *H01M 10/052* | (2010.01) |
| *H01M 4/485* | (2010.01) |
| *H01M 4/505* | (2010.01) |
| *H01M 4/525* | (2010.01) |
| *C01G 53/00* | (2006.01) |

(52) U.S. Cl.
CPC ............. *H01M 10/052* (2013.01); *C01G 53/50* (2013.01); *H01M 4/485* (2013.01); *H01M 4/505* (2013.01); *H01M 4/525* (2013.01); *C01P 2002/52* (2013.01); *C01P 2002/54* (2013.01); *C01P 2004/62* (2013.01); *C01P 2006/16* (2013.01); *C01P 2006/40* (2013.01); *Y02E 60/122* (2013.01)

(58) Field of Classification Search
CPC ..................................................... H01M 4/131
See application file for complete search history.

(56) References Cited

U.S. PATENT DOCUMENTS

| | | | |
|---|---|---|---|
| 6,352,794 B1 | 3/2002 | Nakanishi et al. | |
| 7,799,301 B2 | 9/2010 | Kajiya et al. | |
| 7,935,443 B2 | 5/2011 | Ohzuku et al. | |
| 2001/0005560 A1* | 6/2001 | Yoshida et al. | ............... 429/144 |
| 2005/0142442 A1* | 6/2005 | Yuasa et al. | .................. 429/220 |
| 2006/0093920 A1* | 5/2006 | Cheon et al. | .................. 429/232 |
| 2006/0292452 A1 | 12/2006 | Utsugi et al. | |
| 2007/0154815 A1 | 7/2007 | Kawasaki et al. | |
| 2009/0121198 A1 | 5/2009 | Kajiya et al. | |
| 2010/0248032 A1* | 9/2010 | Pitteloud et al. | ............... 429/221 |

FOREIGN PATENT DOCUMENTS

| | | |
|---|---|---|
| CN | 101048899 A | 10/2007 |
| JP | 2003-31219 A | 1/2003 |
| JP | 2004-349146 A | 12/2004 |
| JP | 2004349146 A | 12/2004 |
| JP | 2005-203342 A | 7/2005 |
| JP | 2006-164873 A | 6/2006 |
| JP | 2006164873 A | 6/2006 |
| JP | 2010-092845 A | 4/2010 |
| WO | 2006/049001 A1 | 5/2006 |
| WO | WO 2009041722 A1 * | 4/2009 |

OTHER PUBLICATIONS

International Search Report dated Mar. 23, 2009, issued in PCT/JP2010/055298.
First Office Action issued Jun. 21, 2012 in corresponding Chinese Patent Application No. 201080012820.2 with partial English translation.
Office Action issued Sep. 10, 2013 in corresponding Japanese Patent Application No. 2009-226687 with partial English translation.

* cited by examiner

*Primary Examiner* — Barbara Gilliam
*Assistant Examiner* — Stephan Essex
(74) *Attorney, Agent, or Firm* — Sughrue Mion, PLLC

(57) ABSTRACT

A lithium mixed metal oxide, shown by the following formula (A):

$$Li_x(Mn_{1-y-z-d}Ni_yFe_zM_d)O_2 \qquad (A)$$

wherein M is one or more elements selected from the group consisting of Al, Mg, Ti, Ca, Cu, Zn, Co, Cr, Mo, Si, Sn, Nb and V; x is 0.9 or more and 1.3 or less; y is 0.3 or more and 0.7 or less; z is more than 0 and 0.1 or less, and d is more than 0 and 0.1 or less. A positive electrode active material, including the lithium mixed metal oxide. A positive electrode, including the positive electrode active material. A nonaqueous electrolyte secondary battery, including the positive electrode.

8 Claims, No Drawings

LITHIUM COMPOSITE METAL OXIDE AND POSITIVE ELECTRODE ACTIVE MATERIAL

CROSS REFERENCE TO RELATED APPLICATION

This application is a National Stage of International Application No. PCT/JP2010/055298 filed Mar. 18, 2010, claiming priority based on Japanese Patent Application No. 2009-069548, filed Mar. 23, 2009, and Japanese Patent Application No. 2009-226687, filed Sep. 30, 2009, the contents of all of which are incorporated herein by reference in their entirety.

TECHNICAL FIELD

The present invention relates to a lithium mixed metal oxide. More particularly, the present invention relates to a lithium mixed metal oxide used as a positive electrode active material for a nonaqueous electrolyte secondary battery.

BACKGROUND ART

A lithium mixed metal oxide is used as a positive electrode active material in a nonaqueous electrolyte secondary battery, such as a lithium secondary battery. The lithium secondary battery has already been put into practical use as a power source for portable telephones, notebook-sized personal computers, and the like, and also attempted to be used in medium and large size applications, such as applications of use for automobiles or electric power storages.

JP-A-2000-195516 specifically discloses Li $(Mn_{0.1}Ni_{0.45}Fe_{0.45})O_2$ as the conventional lithium mixed metal oxide.

DISCLOSURE OF THE INVENTION

However, it is difficult to say that a nonaqueous electrolyte secondary battery obtained by using the above conventional lithium mixed metal oxide as a positive electrode active material is sufficient from the viewpoint of discharge capacity. It is an object of the present invention to provide a lithium mixed metal oxide which can provide a nonaqueous electrolyte secondary battery showing a larger discharge capacity.

The present invention provides the followings.
<1> A lithium mixed metal oxide, shown by the following formula (A):

$$Li_x(Mn_{1-y-z-d}Ni_yFe_zM_d)O_2 \quad (A)$$

wherein M is one or more elements selected from the group consisting of Al, Mg, Ti, Ca, Cu, Zn, Co, Cr, Mo, Si, Sn, Nb and V; x is 0.9 or more and 1.3 or less; y is 0.3 or more and 0.7 or less; z is more than 0 and 0.1 or less, and d is more than 0 and 0.1 or less.
<2> The lithium mixed metal oxide according to <1>, wherein M is Al, Mg, Ti, Ca, or Cu.
<3> The lithium mixed metal oxide according to <1> or <2>, wherein a value of (1−y−z−d) is more than a value of y.
<4> The lithium mixed metal oxide according to any one of <1> to <3>, wherein z is 0.02 or more and 0.07 or less.
<5> The lithium mixed metal oxide according to any one of <1> to <4>, wherein M is Mg, and d is 0.001 or more and 0.005 or less.
<6> A positive electrode active material, including the lithium mixed metal oxide according to any one of <1> to <5>.
<7> A positive electrode, including the positive electrode active material according to <6>.
<8> A nonaqueous electrolyte secondary battery, including the positive electrode according to <7>.
<9> The nonaqueous electrolyte secondary battery according to <8>, further including a separator.
<10> The nonaqueous electrolyte secondary battery according to <9>, wherein the separator is a laminated film which has a heat resistant porous layer and a porous film laminated to each other.

MODE FOR CARRYING OUT THE INVENTION

The lithium mixed metal oxide of the present invention is shown by the following formula (A):

$$Li_x(Mn_{1-y-z-d}Ni_yFe_zM_d)O_2 \quad (A)$$

wherein M is one or more elements selected from the group consisting of Al, Mg, Ti, Ca, Cu, Zn, Co, Cr, Mo, Si, Sn, Nb, and V; x is 0.9 or more and 1.3 or less; y is 0.3 or more and 0.7 or less; z is more than 0 and 0.1 or less, and d is more than 0 and 0.1 or less.

When a value of x in the above formula (A) is less than 0.9 or more than 1.3, such a value is not preferable because the capacity of a nonaqueous electrolyte secondary battery becomes smaller. In addition, it is preferable that x be 0.95 or more and 1.15 or less from the viewpoint of increasing the capacity of a nonaqueous electrolyte secondary battery.

When a value of y in the above formula (A) is less than 0.3, such a value is not preferable because the capacity of a nonaqueous electrolyte secondary battery becomes smaller, and when a value of y is more than 0.7, such a value is also not preferable because the cycle property of a nonaqueous electrolyte secondary battery is reduced. The value of y is preferably 0.3 or more and 0.6 or less, and more preferably 0.46 or more and 0.48 or less.

When a value of z in the above formula (A) is more than 0.1, such a value is not preferable because the cycle property of a nonaqueous electrolyte secondary battery becomes reduced. In addition, it is preferable that z be preferably 0.01 or more and 0.08 or less, and more preferably 0.02 or more and 0.07 or less, in order to enhance the cycle property of a nonaqueous electrolyte secondary battery, especially at the time of a high temperature operation such as at 60° C.

It is preferable that M in the above formula (A) be Al, Mg, Ti, Ca, or Cu so as to increase the discharge voltage of a nonaqueous electrolyte secondary battery. In addition, in order to more increase the capacity of a nonaqueous electrolyte secondary battery, d is preferably 0.001 or more and 0.08 or less. In the case where M is Al, Ti, Ca or Cu, d is preferably 0.005 or more and 0.07 or less, and more preferably 0.01 or more and 0.05 or less. Moreover, when M is Mg, d is preferably 0.001 or more and 0.005 or less.

It is preferable that a value of (1−y−z−d) in the above formula (A) be larger than that of y from the viewpoint of increasing the cycle properties of a nonaqueous electrolyte secondary battery. In other words, it is preferable that the amount (in moles) of Mn be larger than that (in moles) of Ni in the formula (A).

The lithium mixed metal oxide usually includes primary particles and secondary particles that are formed by aggregation of the primary particles. The average particle diameter of the constituent primary particles of the lithium mixed metal oxide according to the present invention is preferably 0.01 μm or more and 0.5 μm or less, and more preferably 0.05 μm or more and 0.3 μm or less, from the viewpoint of obtaining a nonaqueous electrolyte secondary battery with a high output and a superior cycle property. In addition, the average particle diameter of the secondary particles is preferably 0.1 μm or more and 3 μm or less, and more preferably 0.15 μm or more and 2 μm or less. The average particle diameter of each of the primary particles and secondary particles can be measured by observation with a scanning electron microscope (hereinafter also referred to as SEM). Moreover, it is preferable that the BET specific surface area of the lithium mixed metal oxide of the present invention be 3 m$^2$/g or more and 20 m$^2$/g or less.

From the viewpoint of more improving the effect of the present invention, it is preferable that a crystal structure of the lithium mixed metal oxide of the present invention be an α-NaFeO$_2$ type crystal structure, i.e., a crystal structure that belongs to a space group R-3m. The crystal structure of the lithium mixed metal oxide can be identified from the powder X-ray diffraction pattern obtained by a powder X-ray diffraction measurement using CuKα as a radiation source.

Next, a method for producing the lithium mixed metal oxide of the present invention will be explained. The lithium mixed metal oxide of the present invention can be produced by calcining a lithium mixed metal oxide raw material including predetermined elements at a predetermined molar ratio. As the lithium mixed metal oxide raw material, it is preferably a mixture of a lithium compound and a metal compound-containing raw material including Mn, Ni, Fe, and M (M has the same meaning as defined above and hereinafter the same). The metal compound-containing raw material can be a mixture of metal compounds of Mn, Ni, Fe, and M. Examples of the metal compound include oxides, hydroxides (herein, the hydroxides include oxyhydroxides and hereinafter the same), chlorides, carbonates, sulfates, nitrates, oxalates, and acetates of Mn, Ni, Fe, and M. As the metal compound, the hydroxides are preferably used. In addition, a compound including two or more metal elements selected from the group consisting of Mn, Ni, Fe, and M may be used as the metal compound. The compound can be obtained by coprecipitation, and the compound is preferably a hydroxide containing two or more metal elements selected from the group consisting of Mn, Ni, Fe, and M. Moreover, examples of the lithium compound can be anhydrides and/or hydrates of one or more compounds selected from the group consisting of lithium hydroxide, lithium chloride, lithium nitrate, and lithium carbonate. Among them, lithium hydroxide and/or lithium hydroxide monohydrate is/are preferably used. Further, mixing of the lithium compound and the metal compound-containing raw material including Mn, Ni, Fe, and M may be carried out by either dry mode mixing or wet mode mixing, and from the viewpoint of simplicity, dry mode mixing is preferable. The mixing apparatus can include a stirring mixer, a V-shaped mixer, a W-shaped mixer, a ribbon mixer, a drum mixer, a ball mill, and the like.

Then, the lithium mixed metal oxide raw material is calcined. The raw material may be mixed with an inactive flux as needed. An inactive flux that is difficult to react with the lithium mixed metal oxide raw material during the calcination is preferably used. The inactive flux includes, for example, chlorides (e.g. NaCl, KCl, NH$_4$Cl), fluorides (e.g. NaF, KF, NH$_4$F) and boric acid, among which, the chlorides are preferred. By mixing the raw material with the inactive flux and calcining them, it is possible to promote the reaction of the raw material and also possible to control the particle diameters of primary and secondary particles, and BET specific surface area of the obtained lithium mixed metal oxide. Two or more inactive fluxes may be used. The inactive flux may remain in the lithium mixed metal oxide or may be removed by washing or evaporation.

The calcination temperature is an important factor from the viewpoint of adjusting the particle diameter of primary particles, particle diameter of secondary particles, and BET specific surface area of the lithium mixed metal oxide. Usually, the higher the calcination temperature is, the larger the particle diameter of the primary particles and the particle diameter of the secondary particles tend to be, and the smaller the BET specific surface area tends to be. For example, an average particle diameter of primary particles of the lithium mixed metal oxide obtained when calcined at 900° C. using KCl as an inactive flux is around from 0.7 μm to 1 μm, an average value of secondary particles formed upon aggregation of primary particles is 5 μm to 20 μm, and a BET specific surface area is around 0.3 m$^2$/g. The lower the calcination temperature is, the particle diameter of the primary particles and the particle diameter of the secondary particles tend to become smaller and the BET specific surface area tends to become larger. In this case, the calcination temperature is preferably in a range of from 650° C. to 850° C. The time of keeping the calcination temperature is usually 0.1 to 20 hours, preferably 0.5 to 8 hours. A temperature rising rate up to the calcination temperature is usually 50° C/hour to 400° C/hour, and a temperature dropping rate down to room temperature from the calcination temperature is usually 10° C/hour to 400° C/hour. In addition, as the calcination atmosphere, air, oxygen, nitrogen, argon or mixed gas thereof can be used, but an air atmosphere is preferable.

After calcination, the obtained lithium mixed metal oxide may be pulverized using a ball mill, jet mill, or the like. The pulverization may permit adjusting the BET specific surface area of the lithium mixed metal oxide. Furthermore, pulverization and calcination may be conducted twice or more times repeatedly. In addition, the lithium mixed metal oxide may also be washed or classified, if necessary.

The above-mentioned lithium mixed metal oxide of the present invention is useful as a positive electrode active material in a nonaqueous electrolyte secondary battery with a high capacity.

Furthermore, in the scope in which an effect of the present invention is not remarkably impaired, a compound different from the lithium mixed metal oxide may be attached onto the surface of the particles constituting the lithium mixed metal oxide of the present invention.

The positive electrode active material including the lithium mixed metal oxide of the present invention is suitable for a nonaqueous electrolyte secondary battery. Furthermore, in the present invention, the positive electrode active material may include only the lithium mixed metal oxide of the present invention, and a different compound may be attached onto the surface of the particles as mentioned above.

As a method of producing a positive electrode having the positive electrode active material, the case of producing a positive electrode for a nonaqueous electrolyte secondary battery is described as an example hereinafter.

A positive electrode is produced by supporting a positive electrode mixture containing a positive electrode active material, a conductive material and a binder on a positive electrode current collector. As the conductive material, carbonaceous materials can be used. Examples of the carbonaceous materials include a graphite powder, carbon black, acetylene black, and filamentous carbonaceous materials. Since the carbon black and the acetylene black are particulates and have a large surface area, with the addition of small amount of such materials into the positive electrode mixture, the conductivity inside the positive electrode is enhanced, and the charge-discharge efficiency and the rate property can be improved. However, when added in a too large amount, an adhesion property by the binder between the positive electrode mixture and the positive electrode current collector is lowered, leading to a cause for increase in internal resistance. In general, the proportion of the conductive material in the positive electrode mixture is 5 parts by weight or more and 20 parts by weight or less per 100 parts by weight of the positive electrode active material. In the case of use of a filamentous carbonaceous material, such as graphitized carbon fiber or carbon nanotube, as the conductive material, it is also possible to decrease this proportion.

As the above-described binder, a thermoplastic resin can be used. Specific examples thereof include fluorine resins, such as polyvinylidene fluoride (hereinafter, referred to as PVdF in some cases), polytetrafluoroethylene (hereinafter, referred to as PTEE in some cases), tetrafluoroethylene-propylene hexafluoride-vinylidene fluoride copolymers, propylene hexafluoride-vinylidene fluoride copolymers, and tetrafluoroethylene-perfluoro vinyl ether copolymers; and polyolefin resins, such as polyethylene and polypropylene. Furthermore, two or more of these compounds may be used in admixture. For example, a positive electrode mixture superior in adhesion property with an electrode current collector can be obtained by using a fluorine resin and a polyolefin resin as the binder, and containing them so that the proportion of the fluorine resin relative to the positive electrode mixture is from 1 to 10% by weight and the proportion of the polyolefin resin relative to the positive electrode mixture is from 0.1 to 2% by weight.

For the positive electrode current collector, Al, Ni, stainless steel, and the like, can be used. Al is preferable because it can be processed into a thin film easily and it is cheap. Examples of a method of allowing the positive electrode mixture to be supported on the positive electrode current collector include a method of pressure molding; or a method of pasting the positive electrode mixture using an organic solvent and the like, applying the obtained paste on the positive electrode current collector, drying thereof, and then carrying out pressing and the like to attain fixation thereof. In the case of pasting, a slurry including the positive electrode active material, the conductive material, the binder and the organic solvent is produced. Examples of the organic solvent include amine solvents, such as N,N-dimethylaminopropylamine and diethylenetriamine; ether solvents, such as tetrahydrofuran; ketone solvents, such as methyl ethyl ketone; ester solvents, such as methyl acetate; amide solvents, such as dimethylacetamide and N-methyl-2-pyrrolidone.

Examples of a method of applying a paste of the positive electrode mixture onto the positive electrode current collector include a slit die coating method, a screen coating method, a curtain coating method, a knife coating method, a gravure coating method, and an electrostatic spray method. By the above-mentioned methods, a positive electrode can be manufactured.

As a method of producing a nonaqueous electrolyte secondary battery by using the above-mentioned positive electrode, the case of producing a lithium secondary battery is described as an example hereinafter. That is to say, an electrode group obtained by laminating or laminating and winding a separator, a negative electrode, a separator and the above-mentioned positive electrode in this order is accommodated in a battery can, and the electrode group is impregnated with an electrolytic solution, and thus a nonaqueous electrolyte secondary battery can be obtained.

Examples of the shape of the above-mentioned electrode group include a shape having a cross-section when the electrode group is cut in a direction perpendicular to the winding of the electrode group is circle, ellipse, rectangle, and rounded rectangle. Furthermore, examples of the shape of the battery may include a paper shape, a coin shape, a cylindrical shape, and a rectangular shape.

The above-mentioned negative electrode is not particularly limited as long as it is capable of being doped and dedoped with a lithium ion at an electric potential that is lower than that of the positive electrode, and examples thereof may include an electrode formed by allowing a negative electrode mixture containing a negative electrode material to be supported by a negative electrode current collector, or an electrode consisting of a single negative electrode material. Examples of the negative electrode material may include a carbonaceous material, a chalcogen compound (an oxide, a sulfide, and the like), a nitride, metal or an alloy, which are materials capable of being doped and dedoped with a lithium ion at an electric potential that is lower than that of the positive electrode. Furthermore, such negative electrode materials may be mixed and used.

The above-mentioned negative electrode material is exemplified hereinafter. Specific examples of the above-mentioned carbonaceous material may include graphite, such as natural graphite and artificial graphite, cokes, carbon black, pyrolytic carbons, carbon fiber, and a calcined product of an organic polymer compound. Specific examples of the oxide may include oxides of silicon represented by the formula $SiO_x$ (wherein x denotes a positive real number), such as $SiO_2$ and SiO; oxides of titanium represented by the formula $TiO_x$ (wherein x denotes a positive real number), such as $TiO_2$ and TiO; oxides of vanadium represented by the formula $VO_x$ (wherein x denotes a positive real number), such as $V_2O_5$ and $VO_2$; oxides of iron represented by the formula $FeO_x$ (wherein x denotes a positive real number), such as $Fe_3O_4$, $Fe_2O_3$, and FeO; oxides of tin represented by the formula $SnO_x$ (wherein x denotes a positive real number), such as $SnO_2$ and SnO; oxides of tungsten represented by the formula $WO_x$ (wherein x denotes a positive real number), such as $WO_3$ and $WO_2$; and mixed metal oxides containing lithium and titanium and/or vanadium, such as $Li_4Ti_5O_{12}$, $LiVO_2$, and $Li_{1.1}V_{0.9}O_2$. Specific examples of the sulfide may include sulfides of titanium represented by the formula $TiS_x$ (wherein x denotes a positive real number), such as $Ti_2S_3$, $TiS_2$ and TiS; sulfides of vanadium represented by the formula $VS_x$ (wherein x denotes a positive real number), such as $V_3S_4$, $VS_2$, and VS; sulfides of iron represented by the formula $FeS_x$ (wherein x denotes a positive real number), such as $Fe_3S_4$, $FeS_2$, and FeS; sulfides of molybdenum represented by the formula $MoS_x$ (wherein x denotes a positive real number), such as $Mo_2S_3$ and $MoS_2$; sulfides of tin represented by the formula $SnS_x$ (wherein x denotes a positive real number), such as $SnS_2$ and SnS; sulfides of tungsten represented by the formula $WS_x$ (wherein x denotes a positive real number), such as $WS_2$; sulfides of antimony represented by the formula $SbS_x$ (wherein x denotes a positive real number), such as $Sb_2S_3$; and sulfides of selenium represented by the formula $SeS_x$ (wherein x denotes a positive real number), such as $Se_5S_3$, $SeS_2$, and SeS. Specific examples of the nitride may include lithium-containing nitrides, such as $Li_3N$, and $Li_{3-x}A_xN$ (wherein, A denotes Ni and/or Co, x satisfies $0<x<3$). These carbonaceous materials, oxides, sulfides, and nitrides may be used together, and may be crystalline or amorphous. Furthermore, these carbonaceous materials, oxides, sulfides, and nitrides are supported on mainly a negative electrode current collector and used as an electrode.

Furthermore, specific examples of the metal may include lithium metals, silicon metals, and tin metals. Examples of the alloy may include lithium alloys, such as Li—Al, Li—Ni, and Li—Si; silicon alloys, such as Si—Zn; tin alloys, such as Sn—Mn, Sn—Co, Sn—Ni, Sn—Cu, and Sn—La; and alloys, such as $Cu_2Sb$ and $La_3Ni_2Sn_7$. These metals and alloys are, in most cases, used singly as an electrode (for example, used in the form of foil).

Among the negative electrode materials, carbonaceous materials made of graphite, such as natural graphite and artificial graphite, for a main component are preferably used from the viewpoint of high potential flatness, low average discharge potential, good cyclic performance, and the like. As the shape of the carbonaceous material, for example, any of flakes (e.g. natural graphite), spheres (e.g. mesocarbon microbeads), fibers (e.g. graphitized carbon fiber), and aggregates of fine powder may be used.

The negative electrode mixture may contain a binder if necessary. Examples of the binder may include thermoplastic resins, and specific examples thereof may include PVdF, thermoplastic polyimide, carboxymethylcellulose, polyethylene, and polypropylene.

Examples of the negative electrode current collector may include Cu, Ni, and stainless steel, and from the viewpoint of difficulty of making an alloy with lithium and easiness of processing into a thin film, Cu may be used. A method for allowing a negative electrode mixture to be supported on the negative electrode current collector is the same as in the case of the positive electrode, and includes a method of pressure molding, a method of pasting the negative electrode mixture using a solvent and the like, and applying this on the negative electrode current collector and drying thereof, and then performing pressing to attain press bonding thereof, and the like.

As the separator, materials having the form of a porous film, a nonwoven fabric, a woven fabric or the like, may be used. Examples of the material of the separator may include polyolefin resins, such as polyethylene and polypropylene, fluorine resins, and nitrogen-containing aromatic polymers. Two or more of such materials may be formed into a separator, and the separator materials may be laminated. Examples of the separator may include separators described in JP-A-2000-30686, JP-A-10-324758 and the like. It is advantageous that the thickness of the separator becomes thinner, provided that mechanical strength is maintained, from the viewpoint of increase in the volume energy density of a battery and decrease in the internal resistance thereof, and it is usually around from 5 to 200 μm, and preferably around from 5 to 40 μm.

The separator preferably includes a porous film containing a thermoplastic resin. A nonaqueous electrolyte secondary battery usually has a function by which, when an abnormal current flows in the battery because of short circuit between a positive electrode and a negative electrode and the like, the current is interrupted to block (shutdown) the flow of excessive current. Herein, the shutdown is carried out by obstructing micropores of the porous film in the separator when the temperature exceeds the usual temperature for use. Then, after the shutdown, it is preferable that even if the temperature in the battery is increased to some extent, film destruction due to the temperature should not occur, and the shutdown state be maintained. Examples of such a separator include a laminated film which has a heat resistant porous layer and a porous film laminated to each other. When such a film is used as a separator, the heat resistant property of a secondary battery in the present invention can be enhanced. In the laminated film, the heat resistant porous layer may be laminated onto both surfaces of the porous film.

Hereinafter, the laminated film which has a heat resistant porous layer and a porous film laminated to each other is described.

In the laminated film, the heat resistant porous layer is a layer having higher heat resistant property than the porous film. The heat resistant porous layer may be formed from an inorganic powder, and may contain a heat resistant resin. Because the heat resistant porous layer contains a heat resistant resin, the heat resistant porous layer can be formed by an easy technique, such as coating. Examples of the heat resistant resin may include polyamide, polyimide, polyamide-imide, polycarbonate, polyacetal, polysulfone, polyphenylene sulfide, polyether ketone, aromatic polyester, polyether sulfone, and polyether imide. From the viewpoint of enhancing the heat resistant property, polyamide, polyimide, polyamide-imide, polyether sulfone, and polyether imide are preferable, and polyamide, polyimide, and polyamide-imide are more preferable. Nitrogen-containing aromatic polymers, such as aromatic polyamide (para-oriented aromatic polyamide, meta-oriented and aromatic polyamide), aromatic polyimide, and aromatic polyamide-imide are furthermore preferable. Aromatic polyamide is particularly preferable. In production aspect, para-oriented aromatic polyamide (hereinafter, referred to as "para-aramide" in some cases) is more particularly preferable. Furthermore, examples of the heat resistant resin may include poly-4-methyl pentene-1 and cyclic olefin polymer. Use of such heat resistant resins makes it possible to enhance the heat resistant property of a laminated film, that is, the thermal film breaking temperature of a laminated film. When the nitrogen-containing aromatic polymer is used among such heat resistant resins, compatibility with an electrolytic solution, that is, a liquid retaining property in the heat resistant porous layer may also be improved, possibly due to polarity in its molecule, and also the rate of impregnation of an electrolytic solution in the production of a nonaqueous electrolyte secondary battery is high, and also the charge and discharge capacity of a nonaqueous electrolyte secondary battery is further enhanced.

The thermal film breaking temperature of such a laminated film is dependent upon the kind of the heat resistant resin, and is selected and used according to places for use and purposes for use. More specifically, the thermal film breaking temperature can be controlled to around 400° C. when the above-mentioned nitrogen-containing aromatic polymer is used as the heat resistant resin, to around 250° C. when poly-4-methyl pentene-1 is used, and to around 300° C. when cyclic olefin polymer is used, respectively. Furthermore, the thermal film breaking temperature can also be controlled to, for example, around 500° C. or more when the heat resistant porous layer is formed from an inorganic powder.

The above-mentioned para-aramide is obtained by condensation polymerization of para-oriented aromatic diamine and para-oriented aromatic dicarboxylic acid halide, and consists substantially of a repeating unit in which an amide bond is linked at a para-position or orientation position according to the para-position of an aromatic ring (for example, orientation position extending coaxially or parallel toward the reverse direction, such as 4,4'-biphenylene, 1,5-naphthalene, and 2,6-naphthalene). Specific examples thereof include para-aramides having a para-orientation type structure or a structure according to the para-orientation type, such as poly(para-phenylene terephthalamide), poly(para-benzamide), poly(4,4'-benzanilide terephthalamide), poly(para-phenylene-4,4'-biphenylene dicarboxylic acid amide), poly(para-phenylene-2,6-naphthalene dicarboxylic acid amide), poly(2-chloro-para-phenylene terephthalamide), and para-phenylene terephthalamide/2,6-dichloro para-phenylene terephthalamide copolymer.

The aromatic polyimide is preferably a wholly aromatic polyimide produced by condensation polymerization of aromatic dianhydride and diamine. Specific examples of the dianhydride may include pyromellitic acid dianhydride, 3,3', 4,4'-diphenylsulfone tetracarboxylic acid dianhydride, 3,3',4,4'-benzophenone tetracarboxylic acid dianhydride, 2,2'-bis(3,4-dicarboxyphenyl)hexafluoropropane, and 3,3',4,4'-biphenyltetracarboxylic acid dianhydride. Specific examples of the diamine may include oxydianiline, para-phenylenediamine, benzophenone diamine, 3,3'-methylenedianiline, 3,3'-diaminobenzophenone, 3,3'-diaminodiphenyl sulfone, and 1,5'-naphthalene diamine. Furthermore, polyimide soluble in a solvent can be suitably used. Examples of such a polyimide may include a polyimide of a polycondensate of 3,3',4,4'-diphenylsulfone tetracarboxylic acid dianhydride and an aromatic diamine.

Examples of the aromatic polyamide-imide may include a product obtained by condensation polymerization using aromatic dicarboxylic acid and aromatic diisocyanate, and a product obtained by condensation polymerization using aromatic dianhydride and aromatic diisocyanate. Specific examples of the aromatic dicarboxylic acid may include isophthalic acid, and terephthalic acid. Specific examples of the aromatic dianhydride may include trimellitic anhydride. Specific examples of the aromatic diisocyanate may include 4,4'-diphenylmethane diisocyanate, 2,4-tolylene diisocyanate, 2,6-tolylene diisocyanate, ortho-tolylane diisocyanate, and m-xylene diisocyanate.

Furthermore, from the viewpoint of enhancing ion permeability, it is preferable that the thickness of the heat resistant porous layer be thin, and the thickness is preferably 1 μm or more and 10 μm or less, further preferably 1 μm or more and 5 μm or less, and particularly preferably 1 μm or more and 4 μm or less. Furthermore, the heat resistant porous layer has micropores, and the pore size (diameter) thereof is usually 3 μm or less, and preferably 1 μm or less. Furthermore, when the heat resistant porous layer contains the heat resistant resin, the heat resistant porous layer further can also contain the below-mentioned filler.

In the laminated film, it is preferable that the porous film have micropores and have a shutdown function. In this case, the porous film contains a thermoplastic resin. The size of the micropore in the porous film is usually 3 μm or less, and preferably 1 μm or less. The porosity of the porous film is usually from 30 to 80% by volume, preferably from 40 to 70% by volume. In the nonaqueous electrolyte secondary battery, when the temperature exceeds the usual temperature for use, the porous film containing a thermoplastic resin can obstruct the micropores by the softening of the thermoplastic resin constituting the porous film.

As the thermoplastic resin, any thermoplastic resin can be selected as long as it is not dissolved in an electrolytic solution in the nonaqueous electrolyte secondary battery. Specific examples thereof may include polyolefin resins, such as polyethylene and polypropylene, and thermoplastic polyurethane resins, and two or more thereof may be used. From the viewpoint of being softened and shut down at lower temperatures, it is preferable that the resin contain polyethylene. Specific examples of the polyethylene may include polyethylenes, such as low-density polyethylene, high-density polyethylene, and linear polyethylene, and also include ultra high molecular weight polyethylene having a molecular weight of 1,000,000 or more. From the viewpoint of enhancing the puncture strength of the porous film, the thermoplastic resin constituting the film preferably contains at least ultra high molecular weight polyethylene. Furthermore, from the aspect of manufacturing a porous film, the thermoplastic resin may preferably contain wax made of polyolefin having a low molecular weight (weight-average molecular weight: 10,000 or less).

In addition, the thickness of the porous film in a laminated film is usually from 3 μm to 30 μm, and preferably from 3 μm to 25 μm. Furthermore, in the present invention, the thickness of the laminated film is usually 40 μm or less and preferably 20 μm or less. It is preferable that the value of A/B be 0.1 or more and 1 or less, where the thickness of the heat resistant porous layer is A (μm) and the thickness of the porous film is B (μm).

Furthermore, when the heat resistant porous layer contains the heat resistant resin, the heat resistant porous layer may contain one or more fillers. The material of the filler may be selected from any of an organic powder, an inorganic powder or a mixture thereof. Particles constituting the filler preferably have an average particle diameter of 0.01 μm or more and 1 μm or less.

Examples of the organic powder may include powders made of organic substances, such as copolymers of single or two or more of styrene, vinyl ketone, acrylonitrile, methyl methacrylate, ethyl methacrylate, glycidyl methacrylate, glycidyl acrylate, and methyl acrylate; fluorine-based resins, such as polytetrafluoroethylene, ethylene tetrafluoride-propylene hexafluoride copolymer, ethylene tetrafluoride-ethylene copolymer and polyvinylidene fluoride; melamine resins; urea resins; polyolefins; and polymethacrylates. The organic powders may be used singly, or in admixture of two or more thereof. Among these organic powders, polytetrafluoroethylene powder is preferable from the viewpoint of chemical stability.

Examples of the inorganic powder may include powders made of inorganic substances, such as metal oxide, metal nitride, metal carbide, metal hydroxide, carbonate, and sulfate. Among these substances, powders made of inorganic substances having low conductivity are preferably used. Specific examples thereof include powders made of alumina, silica, titanium dioxide, or calcium carbonate. The inorganic powders may be used singly or in mixture of two or more thereof. Among these inorganic powders, from the viewpoint of chemical stability, alumina powder is preferable. Herein, it is preferable that all the particles constituting the filler be alumina particles. A more preferable embodiment is that all the particles constituting the filler are alumina particles, and part or all of them are substantially spherical alumina particles. When the heat resistant porous layer is formed from an inorganic powder, the above-exemplified inorganic powders may be used, and a binder may be mixed therewith and used if necessary.

The content of the filler when the heat resistant porous layer contains the heat resistant resin depends upon the specific gravity of the material of the filler. For example, the weight of the filler is usually 5 or more and 95 or less, preferably 20 or more 95 or less, and more preferably 30 or more and 90 or less, when the total weight of the heat resistant porous layer is made to be 100, in the case where all the particles constituting the filler are alumina particles. Such ranges can be appropriately set according to the specific gravity of the material of the filler.

The shape of the particles constituting the filler includes a substantially spherical shape, a plate shape, a columnar shape, a needle-like shape, a whisker shape, a fiber shape, and the like, and any of shapes may be used. From the viewpoint that uniform pores can be formed easily, the particles constituting the filler are preferably substantially spherical particles. The substantially spherical particles may include particles having an aspect ratio (particle major axis/particle minor axis) is in the range of 1 or more and 1.5 or less. The particle aspect ratio can be measured by an electron micrograph.

In the present invention, the air permeability of the separator according to the Gurley method is preferably 50 sec/100 cc to 300 sec/100 cc, and further preferably 50 sec/100 cc to 200 sec/100 cc from the viewpoint of the ion permeability. Further, the porosity of the separator is usually 30% by volume to 80% by volume, and preferably 40% by volume to 70% by volume. The separator may be a laminate of separators having different porosities.

In a secondary battery, an electrolytic solution usually contains an electrolyte and an organic solvent. Examples of the electrolyte include lithium salts, such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$ $LiC(SO_2CF_3)_3$, $Li_2B_{10}Cl_{10}$, LiBOB (herein, BOB denotes bis(oxalato)borate), lower aliphatic carboxylic acid lithium salts, and $LiAlCl_4$, and a mixture of two or more thereof may be used. Among them, as the lithium salt, a salt containing at least one selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$, which contain fluorine, is usually used.

In the electrolytic solution, it is possible to use, as the organic solvent, for example, carbonates, such as propylene carbonate, ethylene carbonate (hereinafter also referred to as EC), dimethyl carbonate (hereinafter also referred to as DMC), diethyl carbonate, ethyl methyl carbonate (hereinafter also referred to as EMC), 4-trifluoromethyl-1,3-dioxolan-2-one and 1,2-di(methoxycarbonyloxy)ethane; ethers, such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters, such as methyl formate, methyl acetate and γ-butyrolactone; nitriles, such as acetonitrile and butyronitrile; amides, such as N,N-dimethylformamide and N,N-dimethylacetamide; carbamates, such as 3-methyl-2-oxazolidone; sulfur-containing compounds, such as sulfolane, dimethyl sulfoxide and 1,3-propane sultone; or compounds obtained by further introducing a fluorine substituent into the above organic solvents, and two or more of these solvents may be used in admixture. Among them, a mixed solvent containing carbonates is preferable, and a mixed solvent of cyclic carbonate and non-cyclic carbonate, or a mixed solvent of cyclic carbonate and ethers is further preferable. As the mixed solvent of cyclic carbonate and non-cyclic carbonate, preferable is a mixed solvent containing EC, DMC and EMC because it has a wide operational temperature range, a superior load property, and a persistence secured even if a graphite material, such as natural graphite and artificial graphite is used as the negative electrode active material. Furthermore, from the viewpoint that it is capable of obtaining a particularly superior effect of improving safety, an electrolytic solution including a lithium salt containing fluorine, such as $LiPF_6$, and an organic solvent having a fluorine substituent is preferably used. A mixed solvent containing an ether having a fluorine substituent (e.g. pentafluoropropyl methyl ether, 2,2,3,3-tetrafluoropropyl difluoromethyl ether, etc.) and DMC is superior also in large current discharge property, and is therefore further preferable.

Instead of the above-mentioned electrolytic solution, a solid electrolyte may be used. As the solid electrolyte, for example, organic polymer electrolytes, such as polyethylene oxide type polymer compounds, and polymer compounds containing at least one of polyorganosiloxane chain and polyoxyalkylene chain can be used.

Furthermore, an electrolyte in which a nonaqueous electrolyte electrolytic solution is supported on a polymer compound, that is, a gel type electrolyte may also be used. Furthermore, an inorganic solid electrolyte including sulfides, such as $Li_2S$—$SiS_2$, $Li_2S$—$GeS_2$, $Li_2S$—$P_2S_5$, $Li_2S$—$B_2S_3$, $Li_2S$—$SiS_2$—$Li\,PO_4$, and $Li_2S$—$SiS_2$—$Li_2SO_4$ may be used. Use of such solid electrolytes may further enhance the safety. Furthermore, when the solid electrolyte is used in the nonaqueous electrolyte secondary battery of the present invention, the solid electrolyte may play a role as a separator. In such a case, a separator may not be needed.

EXAMPLE

Next, the present invention will be described in more detail with reference to examples. Further, an evaluation and a charge and discharge test of lithium mixed metal oxides (positive electrode active material) were carried out as follows.
(1) Production of Positive Electrode
To a mixture of a positive electrode active material and a conductive material (a mixture of acetylene black and graphite in the weight ratio of 9:1), a solution of PVdF in N-methyl-2-pyrrolidone (hereinafter, referred to as "NMP" in some cases) as a binder was added so that the resultant mixture had a composition of positive electrode active material:conductive material:binder=86:10:4 (weight ratio), and the mixture was kneaded so as to obtain a paste. The paste was applied on an Al foil having the thickness of 40 μm as a current collector and dried in vacuum at 150° C. for 8 hours to obtain a positive electrode.
(2) Production of Nonaqueous Electrolyte Secondary Battery (Coin Cell)
The electrode obtained in the above (1) was used as a positive electrode. In a lower lid of a coin cell (manufactured by Hohsen Corp.), the positive electrode was placed by arranging the aluminum foil to face downward, a separator including a laminated film obtained in Production Example 1 described later was placed thereon, and then an electrolyte solution of 300 μl was injected thereto. The electrolyte solution used was prepared by dissolving $LiPF_6$ in a mixed solvent of EC:DMC:EMC of 30:35:35 by volume so as to have a concentration of 1 mole/liter. Then, using metallic lithium as a negative electrode, the metallic lithium was placed on the upper side of the separator of the laminated film, covered with an upper lid using a gasket interposed therebetween, and caulked by a caulking machine to produce a nonaqueous electrolyte secondary battery (coin-shaped battery R2032). The assembly of the battery was carried out under an argon atmosphere in a glove box.
(3) Charge and Discharge Test
Using the above coin-shaped battery, a charge and discharge test was performed under the following conditions.
<Charge and Discharge Test>
Test temperature: 25° C.,
Charge maximum voltage: 4.3 V, Charge time: 8 hours, Charge current: 0.2 mA/cm$^2$,
Discharge minimum voltage: 3.0 V, Constant current discharge, Discharge current: 0.2 mA/cm$^2$.
(4) Evaluation of Positive Electrode Active Material
1. Composition Analysis of Lithium Mixed Metal Oxide
A powder was dissolved in hydrochloric acid, and then the composition was determined using an inductively coupled plasma atomic emission spectroscopy (SPS3000, hereinafter referred to as "ICP-AES" in some cases).
2. Measurement of Average Value of Particle Diameter of Primary Particles and Secondary Particles by Sem Observation
Particles constituting the lithium mixed metal oxide were placed on an electrically conductive sheet pasted onto a sample stage, and irradiated with electron beams having an acceleration voltage of 20 kV using JSM-5510 manufactured by JEOL Ltd., and SEM observation was carried out. The average particle diameter of the primary particles was determined by arbitrarily extracting 50 primary particles from an image (SEM photograph) obtained by SEM observation, measuring each particle diameter, and calculating the average value. Moreover, the average particle diameter of the secondary particles was similarly determined by arbitrarily extracting 50 secondary particles from an SEM photograph, measuring each particle diameter, and calculating the average value.

3. Measurement of Average Particle Diameter of Powder by Laser Diffraction/Scattering Particle Size Distribution Analysis Lithium mixed metal oxide powder of 0.1 g was poured into deionized water of 50 mL, and irradiated with a supersonic wave for two minutes by using an ultrasonic generator (SONIFIER 450), thereby producing a powder-dispersed solution. The dispersed solution was used as a sample and the $D_{50}$ value obtained by using a particle size distribution analyzer (Mastersizer 2000 manufactured by Malvern Instruments Ltd) was used as an average particle diameter. The average particle diameter obtained here represents an average particle diameter of the entire powder consisting of primary particles and secondary particles formed by aggregation of the primary particles.

Comparative Example 1

1. Production of Lithium Mixed Metal Oxide

Using nickel(II) chloride hexahydrate, manganese(II) chloride tetrahydrate, and iron(II) chloride tetrahydrate, they were respectively weighed so that the molar ratio of Ni:Mn:Fe became 0.45:0.45:0.10, and added to and dissolved in deionized water with stirring, thereby obtaining a nickel-manganese-iron mixed aqueous solution. In addition, a separately prepared aqueous solution (pH=14) of potassium hydroxide was stirred and the above nickel-manganese-iron mixed aqueous solution was dropwise added thereto to form a coprecipitate, which gave a coprecipitated slurry. The pH of the coprecipitated slurry was 13.

Then, the coprecipitated slurry was filtered and washed with distilled water, and the resulting solid was dried at 100° C. to obtain a coprecipitate $P_1$ (a hydroxide containing Ni, Mn and Fe). Using an agate mortar, the coprecipitate $P_1$, lithium hydroxide monohydrate and potassium chloride (an inactive flux) were dry-mixed to yield a mixture. The mixture was charged into an alumina calcination container, calcined by maintaining in an air atmosphere at 800° C. for 6 hours using an electric furnace and then cooled to room temperature to obtain a calcined product. The calcined product was pulverized, and the resulting pulverized product was washed with distilled water by decantation, and filtered to give a solid. The solid was dried at 100° C. to obtain a powder $A_1$.

As a result of the composition analysis of the powder $A_1$, it was found that the molar ratio of Li:Ni:Mn:Fe was 1.21:0.45:0.45:0.10. In addition, the average value of the particle diameter of the primary particles constituting the powder $A_1$ was 0.3 μm.

2. Charge and Discharge Test of Nonaqueous Electrolyte Secondary Battery

A coin-shaped battery was fabricated using the powder $A_1$ as a positive electrode active material, and a charge and discharge test of the battery was carried out to find that the discharge capacity was 131 mAh/g.

Example 1

1. Production of Lithium Mixed Metal Oxide

Using nickel(II) chloride hexahydrate, manganese(II) chloride tetrahydrate, iron(II) chloride tetrahydrate, and aluminum(III) chloride hexahydrate, they were respectively weighed so that the molar ratio of Ni:Mn:Fe:Al became 0.47:0.48:0.04:0.01, and among these, nickel(II) chloride hexahydrate, manganese(II) chloride tetrahydrate, and iron(II) chloride tetrahydrate were added to deionized water and dissolved with stirring, thereby obtaining a nickel-manganese-iron mixed aqueous solution. In addition, a separately prepared aqueous solution (pH=14) of potassium hydroxide was stirred and the above nickel-manganese-iron mixed aqueous solution was dropwise added thereto to form a coprecipitate, which gave a coprecipitated slurry. The pH of the coprecipitated slurry was 13. Deionized water was added to this coprecipitated slurry to adjust the pH to 9, and aluminum(III) chloride hexahydrate that had been weighed above was added to the slurry. The slurry obtained by stirring was filtered and washed with distilled water to give a solid, which was dried at 100° C. to obtain a coprecipitate $Q_1$ (a hydroxide containing Ni, Mn, Fe, and Al). Using an agate mortar, the coprecipitate $Q_1$, lithium hydroxide monohydrate and potassium chloride (an inactive flux) were dry-mixed to yield a mixture. The mixture was charged into an alumina calcination container, calcined by maintaining in an air atmosphere at 800° C. for 6 hours using an electric furnace and then cooled to room temperature to obtain a calcined product. The calcined product was pulverized, and the resulting pulverized product was washed with distilled water by decantation, and then filtered to give a solid. The solid was dried at 100° C. to obtain a powder $B_1$.

As a result of composition analysis of the powder $B_1$, it was found that the molar ratio of Li:Ni:Mn:Fe:Al was 1.15:0.47:0.48:0.04:0.01. In addition, the average value of the particle diameter of the primary particles constituting the powder $B_1$ was 0.18 μm.

2. Charge and Discharge Test of Nonaqueous Electrolyte Secondary Battery

A coin-shaped battery was fabricated using the powder $B_1$ as a positive electrode active material, and a charge and discharge test was carried out to find that the discharge capacity was 142 mAh/g, which was found to be a larger capacity as compared with the case (Comparative Example 1) where $A_1$ was used as a positive electrode active material.

Example 2

1. Production of Lithium Mixed Metal Oxide

Using nickel(II) chloride hexahydrate, manganese(II) chloride tetrahydrate, iron(II) chloride tetrahydrate, and aqueous titanium(IV) sulfate, they were respectively weighed so that the molar ratio of Ni:Mn:Fe:Ti became 0.47:0.48:0.04:0.01, and among these, nickel(II) chloride hexahydrate, manganese(II) chloride tetrahydrate, and iron(II) chloride tetrahydrate were added to deionized water and dissolved with stirring, thereby obtaining a nickel-manganese-iron mixed aqueous solution. In addition, a separately prepared aqueous solution (pH=14) of potassium hydroxide was stirred and the above aqueous solution was dropwise added thereto to form a coprecipitate, which gave a coprecipitated slurry. The pH of the coprecipitated slurry was 13. Deionized water was added to this coprecipitated slurry to adjust the pH to 9, and the aqueous titanium(IV) sulfate that had been weighed above was added to the slurry. The slurry obtained by stirring was filtered and washed with distilled water to give a solid. The solid was dried at 100° C. to obtain a coprecipitate $Q_2$ (a hydroxide containing Ni, Mn, Fe, and Ti). Using an agate mortar, the coprecipitate $Q_2$, lithium hydroxide monohydrate and potassium chloride (an inactive flux) were dry-mixed to yield a mixture. The mixture was charged into an alumina calcination container, calcined by maintaining in an air atmosphere at 800° C. for 6 hours using an electric furnace and then cooled to room temperature to obtain a calcined product. The calcined product was pulverized, and the resulting pulverized product was washed with distilled water by decantation, and then filtered to give a solid. The solid was dried at 100° C. to obtain a powder $B_2$.

As a result of composition analysis of the powder $B_2$, it was found that the molar ratio of Li:Ni:Mn:Fe:Ti was 1.16:0.47:0.48:0.04:0.01. In addition, the average value of the particle diameter of the primary particles constituting the powder $B_2$ was 0.19 μm.

2. Charge and Discharge Test of Nonaqueous Electrolyte Secondary Battery

A coin-shaped battery was fabricated using the powder $B_2$ as a positive electrode active material, and a charge and discharge test was carried out to find that the discharge capacity was 143 mAh/g, which was found to be a larger capacity as compared with the case (Comparative Example 1) where $A_1$ was used as a positive electrode active material.

Example 3

1. Production of Lithium Mixed Metal Oxide

Using nickel(II) chloride hexahydrate, manganese(II) chloride tetrahydrate, iron(II) chloride tetrahydrate, and magnesium(II) chloride hexahydrate, they were respectively weighed so that the molar ratio of Ni:Mn:Fe:Mg became 0.47:0.48:0.04:0.01, and among these, nickel(II) chloride hexahydrate, manganese(II) chloride tetrahydrate, and iron(II) chloride tetrahydrate were added to deionized water and dissolved with stirring, thereby obtaining a nickel-manganese-iron mixed aqueous solution. In addition, a separately prepared aqueous solution (pH=14) of potassium hydroxide was stirred and the above nickel-manganese-iron mixed aqueous solution was dropwise added thereto to form a coprecipitate, which gave a coprecipitated slurry. The pH of the coprecipitated slurry was 13. Deionized water was added to this coprecipitated slurry to adjust the pH to 9, and the magnesium(II) chloride hexahydrate that had been weighed above was added to the slurry. The slurry obtained by stirring was filtered and washed with distilled water to give a solid. The solid was dried at 100° C. to obtain a coprecipitate $Q_3$ (a hydroxide containing Ni, Mn, Fe, and Mg). Using an agate mortar, the coprecipitate $Q_3$, lithium hydroxide monohydrate and potassium chloride (an inactive flux) were dry-mixed to yield a mixture. The mixture was charged into an alumina calcination container, calcined by maintaining in an air atmosphere at 800° C. for 6 hours using an electric furnace and then cooled to room temperature to obtain a calcined product. The calcined product was pulverized, and the resulting pulverized product was washed with distilled water by decantation, and then filtered to give a solid. The solid was dried at 100° C. to obtain a powder $B_3$.

As a result of composition analysis of the powder $B_3$, it was found that the molar ratio of Li:Ni:Mn:Fe:Mg was 1.15:0.47:0.48:0.04:0.01. In addition, the average value of the particle diameter of the primary particles constituting the powder $B_3$ was 0.18 μm.

2. Charge and Discharge Test of Nonaqueous Electrolyte Secondary Battery

A coin-shaped battery was fabricated using the powder $B_3$ as a positive electrode active material, and a charge and discharge test was carried out to find that the discharge capacity was 137 mAh/g, which was found to be a larger capacity as compared with the case (Comparative Example 1) where $A_1$ was used as a positive electrode active material.

Example 4

1. Production of Lithium Mixed Metal Oxide

Using nickel(II) chloride hexahydrate, manganese(II) chloride tetrahydrate, iron(II) chloride tetrahydrate, and calcium(II) chloride dihydrate, they were respectively weighed so that the molar ratio of Ni:Mn:Fe:Ca became 0.46:0.49:0.04:0.01, and among these, nickel(II) chloride hexahydrate, manganese(II) chloride tetrahydrate, and iron(II) chloride tetrahydrate were added to deionized water and dissolved with stirring, thereby obtaining a nickel-manganese-iron mixed aqueous solution. In addition, a separately prepared aqueous solution (pH=14) of potassium hydroxide was stirred and the above nickel-manganese-iron mixed aqueous solution was dropwise added thereto to form a coprecipitate, which gave a coprecipitated slurry. The pH of the coprecipitated slurry was 13. Deionized water was added to this coprecipitated slurry to adjust the pH to 9, and calcium(II) chloride dihydrate that had been weighed above was added to the slurry. The slurry obtained by stirring was filtered and washed with distilled water to give a solid. The solid was dried at 100° C. to obtain a coprecipitate $Q_4$ (a hydroxide containing Ni, Mn, Fe, and Ca). Using an agate mortar, the coprecipitate $Q_4$, lithium hydroxide monohydrate and potassium chloride (an inactive flux) were dry-mixed to yield a mixture. The mixture was charged into an alumina calcination container, calcined by maintaining in an air atmosphere at 800° C. for 6 hours using an electric furnace and then cooled to room temperature to obtain a calcined product. The calcined product was pulverized, and the resulting pulverized product was washed with distilled water by decantation, and then filtered to give a solid. The solid was dried at 100° C. to obtain a powder $B_4$.

As a result of composition analysis of the powder $B_4$, it was found that the molar ratio of Li:Ni:Mn:Fe:Ca was 1.12:0.46:0.49:0.04:0.01. In addition, the average value of the particle diameter of the primary particles constituting the powder $B_4$ was 0.22 μm.

2. Charge and Discharge Test of Nonaqueous Electrolyte Secondary Battery

A coin-shaped battery was fabricated using the powder $B_4$ as a positive electrode active material, and a charge and discharge test was carried out to find that the discharge capacity was 138 mAh/g, which was found to be a larger capacity as compared with the case (Comparative Example 1) where $A_1$ was used as a positive electrode active material.

Example 5

1. Production of Lithium Mixed Metal Oxide

Using nickel(II) chloride hexahydrate, manganese(II) chloride tetrahydrate, iron(II) chloride tetrahydrate, and copper(II) chloride dihydrate, they were respectively weighed so that the molar ratio of Ni:Mn:Fe:Cu became 0.47:0.48:0.04:0.01, and among these, nickel(II) chloride hexahydrate, manganese(II) chloride tetrahydrate, and iron(II) chloride tetrahydrate were added to deionized water and dissolved with stirring, thereby obtaining a nickel-manganese-iron mixed aqueous solution. In addition, a separately prepared aqueous solution (pH=14) of potassium hydroxide was stirred and the above nickel-manganese-iron mixed aqueous solution was dropwise added thereto to form a coprecipitate, which gave a coprecipitated slurry. The pH of the coprecipitated slurry was 13. The coprecipitated slurry was filtered and washed with distilled water to give a solid, which was dried at 100° C. to obtain a coprecipitate $Q_5$ (a hydroxide containing Ni, Mn, and Fe). Using an agate mortar, the coprecipitate $Q_5$, the copper (II) chloride dihydrate that had been weighed above, lithium hydroxide monohydrate, and potassium chloride (an inactive flux) were dry-mixed to yield a mixture. The mixture was charged into an alumina calcination container, calcined by maintaining in an air atmosphere at 800° C. for 6 hours using an electric furnace and then cooled to room temperature to obtain a calcined product. The calcined product was pulverized, and the resulting pulverized product was washed with distilled water by decantation, and then filtered to give a solid. The solid was dried at 100° C. to obtain a powder $B_5$.

As a result of composition analysis of the powder $B_5$, it was found that the molar ratio of Li:Ni:Mn:Fe:Cu was 1.12:0.47:0.48:0.04:0.01. In addition, the average value of the particle diameter of the primary particles constituting the powder $B_5$ was 0.18 μm.

2. Charge and Discharge Test of Nonaqueous Electrolyte Secondary Battery

A coin-shaped battery was fabricated using the powder $B_5$ as a positive electrode active material, and a charge and discharge test was carried out to find that the discharge capacity was 139 mAh/g, which was found to be a larger capacity as compared with the case (Comparative Example 1) where $A_1$ was used as a positive electrode active material.

Example 6

1. Production of Lithium Mixed Metal Oxide

Using nickel(II) chloride hexahydrate, manganese(II) chloride tetrahydrate, and iron(II) chloride tetrahydrate, they were respectively weighed so that the molar ratio of Ni:Mn:Fe became 0.47:0.48:0.05, and these were added to deionized water and dissolved with stirring, thereby obtaining a nickel-manganese-iron mixed aqueous solution. In addition, a separately prepared aqueous solution (pH=14) of potassium hydroxide was stirred and the above nickel-manganese-iron mixed aqueous solution was dropwise added thereto to form a coprecipitate, which gave a coprecipitated slurry. The pH of the coprecipitated slurry was 13. The coprecipitated slurry was filtered and washed with distilled water, and the resulting solid was dried at 100° C. to obtain a coprecipitate $Q_6$ (a hydroxide containing Ni, Mn, and Fe). Using an agate mortar, the coprecipitate $Q_6$, basic magnesium carbonate that was weighed in 0.95 part by weight relative to 100 parts by weight of the coprecipitate $Q_6$, lithium carbonate, and potassium carbonate (an inactive flux) were dry-mixed to yield a mixture. The mixture was charged into an alumina calcination container, calcined by maintaining in an air atmosphere at 900° C. for 6 hours using an electric furnace and then cooled to room temperature to obtain a calcined product. The calcined product was pulverized, and the resulting pulverized product was washed with distilled water by decantation, and then filtered to give a solid. The solid was dried at 100° C. to obtain a powder $B_6$.

As a result of composition analysis of the powder $B_6$, it was found that the molar ratio of Li:Ni:Mn:Fe:Mg was 1.08:0.47:0.48:0.05:0.0024. In addition, the average value of the particle diameter of the primary particles constituting the powder $B_6$ was 0.18 μm.

2. Charge and Discharge Test of Nonaqueous Electrolyte Secondary Battery

A coin-shaped battery was fabricated using the powder $B_6$ as a positive electrode active material, and a charge and discharge test was carried out to find that the discharge capacity was 149 mAh/g, which was found to be a larger capacity as compared with the case (Comparative Example 1) where $A_1$ was used as a positive electrode active material.

Example 7

1. Production of Lithium Mixed Metal Oxide

Using nickel(II) chloride hexahydrate, manganese(II) chloride tetrahydrate, iron(II) chloride tetrahydrate, and vanadium(IV) oxide sulfate trihydrate, they were respectively weighed so that the molar ratio of Ni:Mn:Fe:V became 0.47:0.48:0.025:0.025, and these were added to deionized water and dissolved with stirring, thereby obtaining a nickel-manganese-iron-vanadium mixed aqueous solution. In addition, a separately prepared aqueous solution (pH=14) of potassium hydroxide was stirred and the above nickel-manganese-iron-vanadium mixed aqueous solution was dropwise added thereto to form a coprecipitate, which gave a coprecipitated slurry. The pH of the coprecipitated slurry was 13. The coprecipitated slurry was filtered and washed with distilled water to give a solid, which was dried at 100° C. to obtain a coprecipitate $Q_7$ (a hydroxide containing Ni, Mn, Fe, and V). Using an agate mortar, the coprecipitate $Q_7$, lithium carbonate and potassium carbonate (an inactive flux) were dry-mixed to yield a mixture. The mixture was charged into an alumina calcination container, calcined by maintaining in an air atmosphere at 900° C. for 6 hours using an electric furnace and then cooled to room temperature to obtain a calcined product. The calcined product was pulverized, and the resulting pulverized product was washed with distilled water by decantation, and then filtered to give a solid, which was dried at 100° C. to obtain a powder $B_7$.

As a result of composition analysis of the powder $B_7$, it was found that the molar ratio of Li:Ni:Mn:Fe:V was 1.13:0.47:0.51:0.02:0.002. In addition, the average value of the particle diameter of the primary particles constituting the powder $B_7$ was 0.15 μm.

2. Charge and Discharge Test of Nonaqueous Electrolyte Secondary Battery

A coin-shaped battery was fabricated using the powder $B_7$ as a positive electrode active material, and a charge and discharge test was carried out to find that the discharge capacity was 142 mAh/g, which was found to be a larger capacity as compared with the case (Comparative Example 1) where $A_1$ was used as a positive electrode active material.

Production Example 1 (Production of Laminated Film)

(1) Production of Coating Fluid

Calcium chloride (272.7 g) was dissolved in 4200 g of NMP, and then 132.9 g of para-phenylenediamine was added and dissolved completely. To the resultant solution, 243.3 g of terephthalic acid dichloride was gradually added and polymerization thereof was carried out to obtain a para-aramide, and this was diluted further with NMP to obtain a para-aramide solution (A) having a concentration of 2.0% by weight. To 100 g of the resultant para-aramide solution, 2 g of an alumina powder (a) (manufactured by Nippon Aerosil Co., Ltd., Alumina C, average particle diameter: 0.02 μm) and 2 g of an alumina powder (b) (Sumicorandom AA03 manufactured by Sumitomo Chemical Co., Ltd., average particle diameter 0.3 μm) were added as a filler in a total amount of 4 g, and these were mixed and treated three times by a nanomizer, and further, filtered through a 1000 mesh wire netting, and defoamed under reduced pressure to produce a slurry-formed coating fluid (B). The weight of the alumina powders (filler) with respect to the total weight of the para-aramide and the alumina powders was 67% by weight.

(2) Production and Evaluation of Laminated Film

A polyethylene porous film (thickness: 12 μm, air permeability: 140 second/100 cc, average pore size: 0.1 μm, porosity: 50%) was used as the porous film. On a PET film having the thickness of 100 μm, the above-mentioned polyethylene porous film was fixed, and the slurry-form coating fluid (B) was applied on the porous film by a bar coater manufactured by Tester Sangyo Co., Ltd. The PET film integrated with the applied porous film was immersed into water that was a poor solvent to allow a para-aramide porous layer (heat resistant porous layer) to precipitate, and then the solvent was dried to yield a laminated film 1 which has a heat resistant porous layer and a porous film laminated to each other. The thickness of the laminated film 1 was 16 μm, and the thickness of the para-aramide porous film (heat resistant porous layer) was 4 μm. The laminated film 1 had an air permeability of 180 second/100 cc, and a porosity of 50%. The cross section of the heat resistant porous layer in the laminated film 1 was observed by a scanning electron microscope (SEM) to find that relatively small micropores of around from 0.03 μm to 0.06 μm and relatively large micropores of around from 0.1 μm to 1 μm were present. The evaluation of the laminated film was carried out as follows.

<Evaluation of Laminated Film>

(A) Measurement of Thickness

The thickness of the laminated film and the thickness of the porous film were measured according to JIS standard (K7130-1992). As the thickness of the heat resistant porous layer, a value obtained by subtracting the thickness of the porous film from the thickness of the laminated film was used.

(B) Measurement of Air Permeability by Gurley Method

The air permeability of the laminated film was measured by digital timer mode Gurley type Densometer manufactured by Yasuda Seiki Seisakusho Ltd., according to JIS P8117.

(C) Porosity

A sample of the resultant laminated film was cut into a square having a side length of 10 cm, and the weight W (g) and the thickness D (cm) thereof were measured. The weights (Wi (g)) of the respective layers in the sample were measured, and the volumes of the respective layers were calculated from Wi and the true specific gravities (true specific gravity i (g/cm³)) of the materials of the respective layers, and the porosity (vol%) was calculated according to the following formula.

Porosity (vol%)=100×{1−(W1/true specific gravity 1+W2/true specific gravity 2+. . . +Wn/true specific gravity n)/(10×10×D)}

By using the laminated film obtained in Production Example 1 as a separator in each Example described above, a lithium secondary battery capable of increasing a thermal film breaking temperature could be obtained.

Industrial Applicability

According to the present invention, a nonaqueous electrolyte secondary battery with a higher discharge capacity can be provided as compared with the conventional lithium secondary battery. The secondary battery is superior also in cycle properties and can further show a higher output at a high current rate. The secondary battery is useful as a nonaqueous electrolyte secondary battery for uses requiring a high output at a high current rate, i.e., for uses in automobile applications, power tools, such as electric tools, and the like.

The invention claimed is:

1. A lithium mixed metal oxide, shown by the following formula (A):

$$Li_x(Mn_{1-y-z-d}Ni_yFe_zM_d)O_2 \qquad (A)$$

wherein M is one element selected from the group consisting of Al, Mg, Ti, Ca, or Cu; x is 0.9 or more and 1.3 or less; y is 0.3 or more and 0.7 or less; z is 0.02 or more and 0.07 or less, and d is 0.001 or more and 0.08 or less, and the BET specific surface area of the lithium mixed metal oxide is in the range of 3 m²/g or more and 20 m²/g or less.

2. The lithium mixed metal oxide according to claim 1, wherein a value of (1−y−z−d) is more than a value of y.

3. The lithium mixed metal oxide according to claim 1, wherein M is Mg, and d is 0.001 or more and 0.005 or less.

4. A positive electrode active material, comprising the lithium mixed metal oxide according to claim 1.

5. A positive electrode, comprising the positive electrode active material according to claim 4.

6. A nonaqueous electrolyte secondary battery, comprising the positive electrode according to claim 5.

7. The nonaqueous electrolyte secondary battery according to claim 6, further comprising a separator.

8. The nonaqueous electrolyte secondary battery according to claim 7, wherein the separator is a laminated film which has a heat resistant porous layer and a porous film laminated to each other.

* * * * *